(No Model.)
F. RHIND.
WICK ADJUSTING DEVICE.
No. 478,288. Patented July 5, 1892.
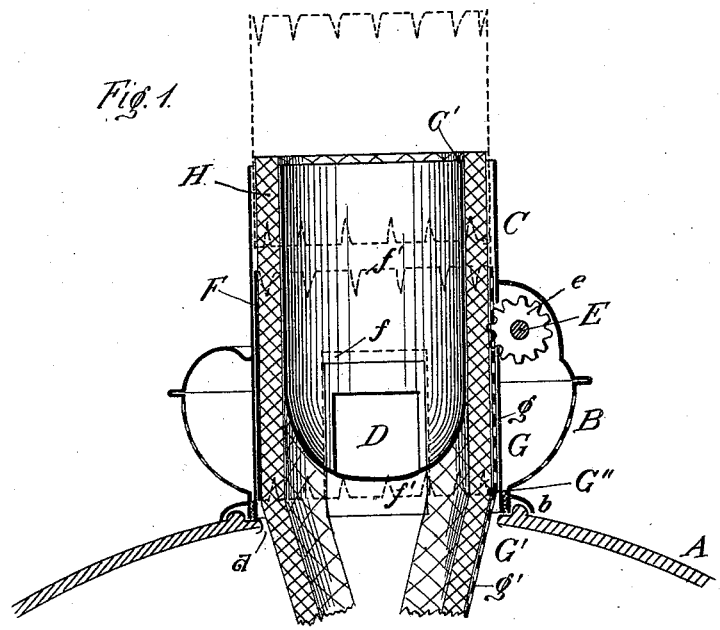
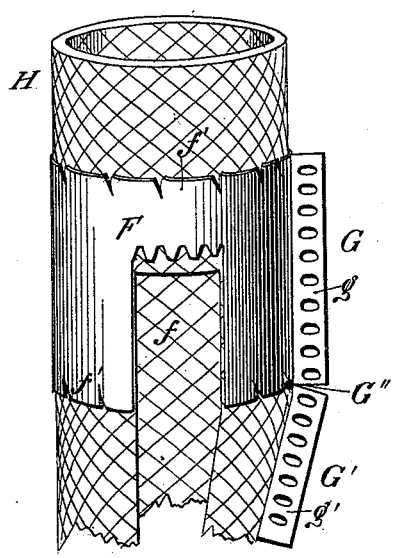
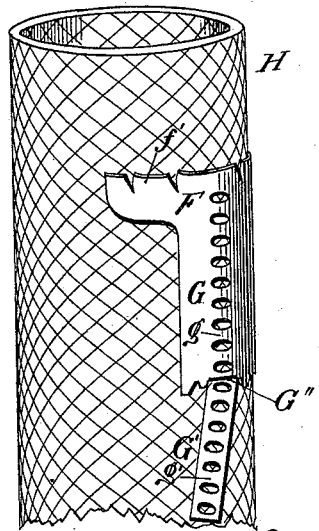
Frank Rhind
INVENTOR.
BY Geo. L. Cooper
ATTORNEY.
WITNESSES.
A. F. Sanborn
Geo. H. Chittenden

UNITED STATES PATENT OFFICE.

FRANK RHIND, OF MERIDEN, CONNECTICUT, ASSIGNOR OF ONE-HALF TO THE EDWARD MILLER & COMPANY, OF SAME PLACE.

WICK-ADJUSTING DEVICE.

SPECIFICATION forming part of Letters Patent No. 478,288, dated July 5, 1892.

Application filed March 10, 1892. Serial No. 424,385. (No model.)

*To all whom it may concern:*

Be it known that I, FRANK RHIND, a citizen of the United States, residing at Meriden, New Haven county, Connecticut, have invented a new and useful Improvement in Wick-Adjusting Devices, of which the following is a specification.

My invention relates to that class of wick-adjusting devices in which a rack engages with a pinion on an operating-shaft. It is intended to provide a hinged or jointed continuation of the rack at its lower end.

In the accompanying drawings, Figure 1 represents in vertical section so much of a lamp and burner as is necessary to show my invention. Figs. 2 and 3, in perspective, show modified portions of my device detached from the burner.

The same letters refer to like parts in the several views.

A designates a lamp fount or body; $a$, a collar-opening in the fount A; B, a burner-body, screw-threaded at $b$; C, an outer and C' an inner wick-tube; D, an air-port; E, a shaft; $e$, a pinion on the shaft E; F, a wick-carrier provided with slot $f$ and teeth $f'$; G, a rack; G', a supplementary rack; $g$ $g'$, teeth in the racks G and G', respectively; G'', a hinge; H, a wick.

In the example of my invention (shown in Fig. 1) of the drawings the burner-body B, wick-tubes C and C', port D, shaft E, and pinion $e$ may be of any ordinary or desired construction. The wick-sleeve F is of an exterior diameter corresponding to the interior diameter of the tube C, so as to slide freely therein. The sleeve F is slotted at $f$, so that it may pass below the ports D, and formed with teeth $f'$ at its upper and lower edges, adapted to engage with the wick H. The sleeve F is also provided with a rack G, (here shown as integral with the sleeve F,) and formed by punching a vertical line of holes through the sleeve, leaving teeth or bars $g$, adapted to mesh with the teeth of the pinion $e$. The construction thus far described is well known. It is found, however, in the practical use of a burner of this class that the rack G is too short to allow of a great adjustment of the wick. As the burner is frequently used on a lamp-fount, as A, provided with a collar-opening, as $a$, of less diameter than that of the sleeve F, it is impracticable to lengthen the sleeve F at its lower end or to provide it with a rigid continuation at one side in the line of the rack G. To secure this desirable increase in length of the rack G and at the same time to permit the use of the burner with a fount of relatively small collar-opening is the object of my present invention. This object I obtain by hinging a supplementary rack G', provided with teeth $g'$ at the lower end of the rack G. When the wick-sleeve F is lowered, as shown in the drawings, the rack G' is free to turn inward on its hinge or pivot G''. When the sleeve F is raised, the supplementary rack G' is forced outward by the pressure of the wick H, so that its teeth $g'$ engage with the teeth of the pinion $e$, as shown by dotted lines in the drawings.

In Fig. 2 of the drawings the rack G is shown as projecting radially from the sleeve F. As before, the supplementary rack G' is hinged to the lower end of the rack G at G'', so as to be capable of motion radially inward. It is clear that the function of this modified form of my device will be the same as that of the form above described.

In Fig. 3 the wick-carrier F is shown as adapted to partially surround the wick H. The racks G and G', teeth $g$ and $g'$, and pivotal connection G'' are similar both in construction and action to the corresponding parts shown in Fig. 1.

It is obvious that mechanical changes other than those shown may be made without departing from my invention, which I conceive to be the employment of a wick-carrier provided with a supplementary rack in line with the ordinary rack in said carrier and pivotally connected therewith.

What I claim as my invention, and desire to secure by Letters Patent of the United States, is as follows:

1. In a wick-adjusting device, the combination of a wick-carrier, a rack on said carrier, and a supplemental rack hinged to said carrier and forming a continuation of said first-named rack, substantially as described.

2. In a wick-adjusting device, the combination of a wicking-carrying sleeve, a rack on said sleeve, and a supplemental rack hinged to said sleeve and forming a continuation of first-named rack, substantially as described.

3. In a wick-adjusting device, the combination of a wick-carrying sleeve, means, as teeth, for attaching said sleeve to the wick, a rack in said sleeve, a supplemental rack below said first-named rack, and a hinge connecting said supplemental rack and said sleeve, substantially as described.

FRANK RHIND.

Witnesses:
 GEO. L. COOPER,
 I. B. MILLER.